Oct. 2, 1956   W. B. ARNESS   2,764,804
TURBINE BLANKS

Filed Sept. 5, 1950   2 Sheets-Sheet 1

Inventor
William B. Arness
By
Christy, Parmelee and Strickland
his Attorneys

Oct. 2, 1956 W. B. ARNESS 2,764,804
TURBINE BLANKS

Filed Sept. 5, 1950 2 Sheets-Sheet 2

Inventor
William B. Arness

By
Christy, Parmelee and Strickland
his Attorneys

United States Patent Office 2,764,804
Patented Oct. 2, 1956

2,764,804

TURBINE BLANKS

William B. Arness, Phoenix, Ariz., assignor to Roberts, Arness and Co., a copartnership Application September 5, 1950, Serial No. 183,234

3 Claims. (Cl. 29—190)

My invention relates to turbine blades, particularly the blades for high temperature service, such as the blades of gas turbines for jet engines, industrial and automotive power turbines, blowers for hot gases and for similar types of heat and power generating or transmitting equipment. The invention consists in certain new and useful improvements in metal blanks of which to produce such turbine blades.

Solid turbine blades for this type of service have been commonly made heretofore by precision casting, or by forging, or by machining from bar stock. Such solid blades possess inherent short-comings, in that they are quite massive or heavy, in consequence of which they develop high centrifugal stresses during turbine operation. Furthermore, such blades have a limited ability to dissipate heat, wherefore they are not adequately enduring in service.

The unpredictable and often short life of solid blades has led to an appreciation of the advantages of hollow blades that permit internal cooling. Internal cooling with air, or any other suitable gaseous or liquid medium, lowers the operating temperature of the blades with respect to the turbine gas temperature, thereby permitting the use of metallic blade materials which are less heat resistant—materials that contain smaller proportions of such alloying elements as cobalt, columbium, etc., which are strategically scarce materials. Blades made of alloyed metals which contain a minimum proportion or none at all of such scarce materials are obviously less expensive to manufacture and are more readily available. Likewise, if scarce materials are used, the hollow blades are capable of more arduous service and longer life in service, thereby conserving scarce materials.

Another advantage of the hollow blades is that for a specified maximum blade temperature, the turbine gas temperatures can be higher than otherwise and the engine efficiency thereby increased, since, as indicated, the superior heat-dissipating qualities of the hollow blades permit an increased temperature differential between the hot turbine gases and bodies of the blades. Still another important advantage is reduction in the weight of the blades.

With such advantages in mind, hollow turbine blades have been produced by various methods with little regard for production costs or efficiency. One method consists in forming the blades from sheet or plate metal by die pressing, or by molding, or by deep drawing the component parts, followed by a welding and final forming of the assembled components into the finished blades. Other methods have also been used, such as forming each blade out of a forged section which has a deep recess in one side, and then welding a cover plate over the recess to provide the essential hollow blade structure. Refined methods of precision casting have also been employed.

Attempts have also been made to form the blades of seamless tubing, followed by welding a boss or base to each blade for mounting it on or attaching it to the turbine wheel.

All of these methods have serious shortcomings. Most of them involves extensive welding, which sets up local stresses and makes for heterogeniety within the metal, which lead to early failure due to fatigue. Forming the blades of a tube is likewise unsatisfactory for the reason that during final shaping of the oval or "air-foil" blade a deep fold is produced at the leading and trailing edges of the blade.

The ideal hollow turbine blade comprises a tubular body having a longitudinally tapered wall that is fashioned integrally with a solid mounting boss or base. In accordance with my invention, I produce such a tubular body in an economical and practical manner. More specifically, I extrude a tube having an integral base. The wall of the tubular body is thicker at the root or base end, and tapers to a thickness at the outer or tip end which is approximately one-half or less of the root or base thickness of the blade. Furthermore, the cross section of the extruded blade is varied around its circumference, so that the wall thickness of the tube is greater at two approximately opposite segments, which are relatively so positioned as to form the leading and trailing edges of the finished blade.

The latter feature (preferably, if not essentially) is obtained in the extruding of the tubular body or turbine-blade blank referred to, the two thickened or heavy areas of the wall of the tubular body forming the leading and trailing edges of the blade finally fashioned from the blank, thereby providing extra metal where the stresses are greatest, and eliminating the undesirable folds at the leading and trailing edges of the blade.

The seriousness of a fold or seam in the leading or trailing edge of a turbine blade cannot be overlooked, as it provides an acute concentration of stress that leads to early fatigue failure of the blade. In accordance with my invention I provide a stress-balanced blank of which a turbine blade can be fashioned, without the inclusion of the undesired fold or lap of metal in the leading and trailing edges of the blade. The body of a blade constructed in accordance with my invention not only has a fold-free section of increased thickness at the leading and trailing edges of the blade, but the internal wall of the blade is formed with a perceptible radius within and along the leading and trailing edges, which avoids a concentration of stress and fortifies the blade body where great strength and durability are required.

With the foregoing comments in mind, the objects of my invention will be clearly understood, and the exemplary apparatus illustrated in the accompanying drawings will disclose to those skilled in the art the manner in which the invention may be practiced. In the drawings.

Figure 1:
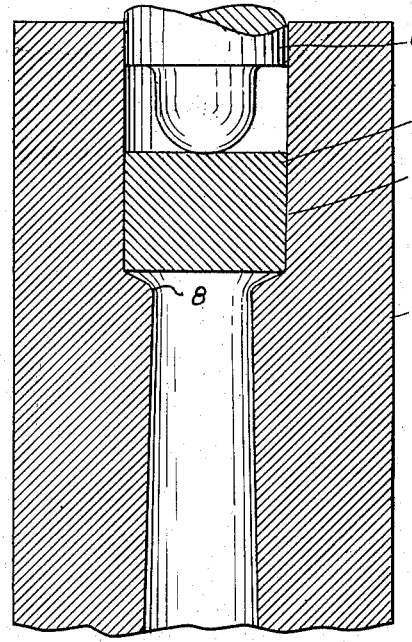
Fig. 1 is a view in vertical section of die apparatus in which an initial step in the production of a blank is illustrated.

While the metals of which hollow turbine blades are produced need not be as highly heat resistant for a given service as solid blades, it is preferable to construct the hollow blades of a tough alloyed metal that is adapted to endure high temperatures without distortion and early fatigue. I may use a steel or alloyed metal having a substantial content of one or more of such recognized alloying elements as chromium, nickel, molybdenum, cobalt, etc., although it is to be noted that the invention is not dependent upon nor limited to the particular composition of the metal.

In accordance with the invention a slug of turbine-blade metal is extruded into the form of a turbine-blade blank, comprising a closed end tube that may be readily fashioned and machined into the final structure of a hollow turbine blade. The tube or blank is closed at one end by a relatively short heavy boss portion that ordinarily exceeds the mass of the relatively long tube portion that forms the hollow body of the finished turbine blade. The wall of the tube portion is of generally round contour throughout its cross section or peripheral extent. Such tube portion tapers in longitudinal section, and is varied in thickness in cross section. More specifically, the wall of the tube portion, as viewed in longitudinal section decreases in thickness from the basal or boss portion outwardly, and at the outer end of the tube portion the wall thickness may be one-half, or less than one-half, of that at the basal end. As viewed in cross section the wall of the tube portion in approximately diametrically opposite regions or segments is of greater thickness than in the intervening or interconnecting regions or segments of the wall, and this relative cross-sectional thickness of the wall regions is maintained throughout the longitudinal taper between the basal and open ends of the tube.

Save for the said opposite thickened regions or segments in the wall of the tube portion, the cross section of the tube portion may be circular, as will later appear in detail, whereby, by pressing such wall laterally between appropriate dies, the tube wall above the boss portion may be brought into the desired air-foil form of a turbine blade, with the thickened segments of the tube wall located in and severally forming the leading and trailing edges of the blade. The boss portion may then be shaped to final form, trimmed, broached or otherwise prepared for securing the blade in a turbine wheel.

Alternatively, the wall of the tube portion as initially extruded may be ovate in cross-sectional form, as will be presently described, with the cross-sectionally thickened segments of the tube wall located adjacent to the minor axes of the oval, and with the tube longitudinally tapered, as in the case of the circular sectional tube mentioned. By initially forming the tube of such ovate section, the flow or movement of metal in the final blade-forming operations may be reduced to a minimum.

My invention is primarily concerned with the production of improved blanks from which the desired hollow turbine blades may be ultimately fashioned. Reference will now be made to the drawings.

Figure 2:
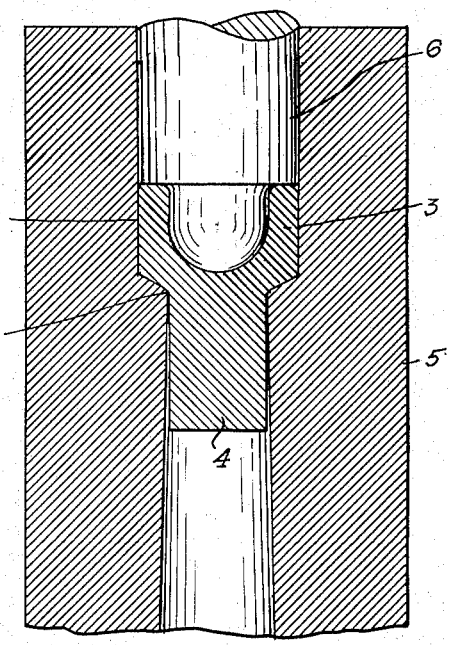
Fig. 2 is a view comparable with Fig. 1, showing the die apparatus in an advanced position of operation.

In Fig. 1, a metallic turbine-blade slug 2 is placed in the cavity 7 of a die 5. An unrestricted orifice 8 opens from the bottom of the cavity, and a plunger 6 is, by means of suitable die-operating mechanism (not shown), driven into the cavity 7, forcing a substantial portion 4 of the slug body through the orifice 8, and forming the remainder of the slug body into a cupped portion 3, as shown in Fig. 2. The intermediate blank 3, 4 thus formed comprises a cupped shaped portion (3) from the bottom of which a boss (4) projects.

Figure 3:
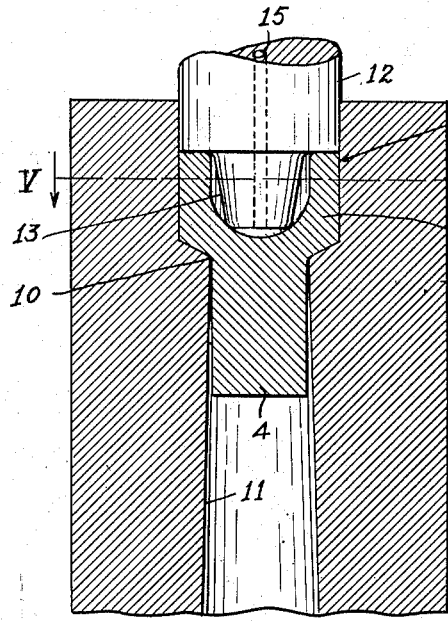
Fig. 3 is a view in vertical section of die apparatus for continuing the production initiated by the apparatus of Figs. 1 and 2.
Figure 5:
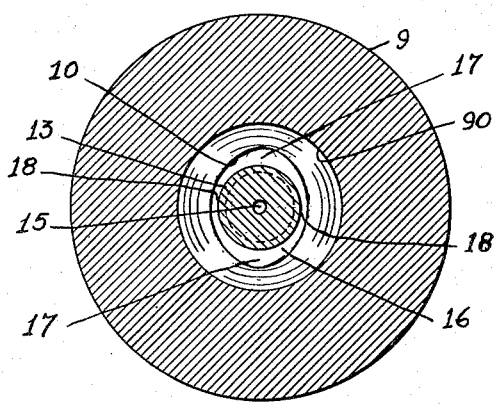
Fig. 5 is a view in cross section, on the plane V—V of Fig. 3, with the work-piece removed from the dies better to illustrate certain details of structure.

This blank 3, 4 is then extruded, either hot or cold, depending on the plastic qualities of the blade metal and type of equipment available, in an extrusion die 9, the bottom of the cavity of this die including an extrusion orifice 10 that is continued through the body of the die in a downwardly drafted passage 11 that receives the boss 4 of the blank, as shown in Fig. 3. A plunger 12, having a properly shaped ram or mandrel portion 13, is closed upon the cupped portion of the blank, as shown, and extruding pressure is applied, forcing the plunger further into the die and initiating the extrusion of metal from the walls of the cupped portion 3 of the blank through the orifice 10. As the plunger descends into the die, the lower end of the ram 13 enters and restricts the orifice 10, forming therewith an annular extrusion matrix or orifice 16, as shown in horizontal section in Fig. 5, the blank being extruded having been removed from the die for clarity of illustration. The extrusion orifice 10 in the die 9 is elliptical or ovate in form, while the ram 13 is circular in cross section, and it is for simplicity in phraseology that the matrix or orifice 16 formed by and between orifices 10 and the mandrel portion 13 is referred to as an "annular" extrusion matrix or orifice.

Figure 4:
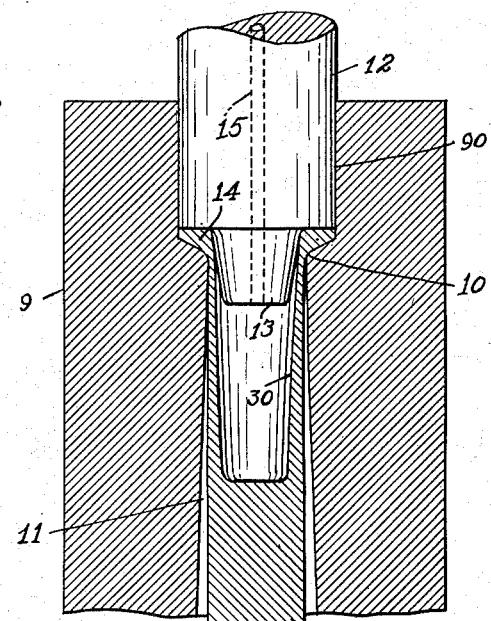
Fig. 4 is a view of the apparatus of Fig. 3, showing the finish of an extruding step used in the production of the blank.

It will be perceived in Figs. 3 and 4 that the body of the ram portion 13 of the plunger is drafted or tapered in such manner that the further the plunger 12 descends into the die 9 and the further the ram 13 enters the orifice 10, the narrower becomes the width of the annular matrix 16. Thus, as the plunger 12 is forced, as it is, into the die 9, the substance of the walls of the cupped blank portion 3, that "overhang" or lie radially outward from the boss portion 4, is extruded through the extruding matrix 16, and progressively develops a tube 30 (Fig. 4) whose base is formed by and closed by the boss 4. As such development of the tube progresses and the width of the matrix 16 is modified or decreased, the thickness of the tube wall, which is determined by the width of orifice 16, is correspondingly modified or decreased, with the effect that the wall of the finished tube 30 is formed with a taper in longitudinal section, as appears in Fig. 4.

It will be noted that the annular extrusion matrix 16 is of greater breadth in the opposite portions 17, 17 than in the interconnecting portions 18, 18, and thus it is that the wall of the tube 30, while of generally round contour throughout its cross-sectional or external peripheral extent, varies in cross sectional thickness; that is to say, the opposite tube wall segments formed by the regions or portions 17, 17 of the annular matrix are greater in cross sectional thickness than the segments elsewhere in the periphery of the tube wall.

During the extrusion of the tube closed at its lower end a vacuum tends to form within the tube, and a feature consists in relieving such vacuum and neutralizing any tendency for the tube wall to be sucked in or collapsed. More particularly, I provide an inlet passage 15 in the plunger and ram or mandrel unit 12, 13, whereby air is admitted to the interior of the tube during the extrusion process.

The flashing or butt 14 remaining at the open end of the extruded tube is cut away before the tube is fashioned into the finished turbine blade. And thus an extruded integral tube is provided for the ready finishing into the form of the desired hollow turbine blade.

I have described the steps of forming the intermediate blank 3, 4 in the die apparatus 5, 6 as separate from the extrusion process conducted in the die apparatus 9, 12, but it will be understood that in some cases the several steps may be conducted in a single die apparatus, whereby the slug 2 may be brought into the desired tubular form in a single forming and extrusion process.

Figure 6:
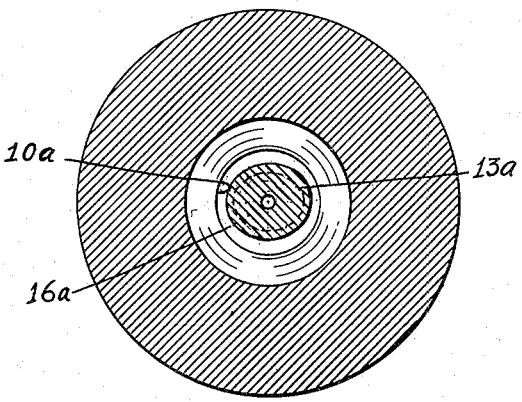
Fig. 6 is a view comparable with Fig. 5, illustrating a modification in die construction in which the blank of this invention may be produced.
Figure 7:
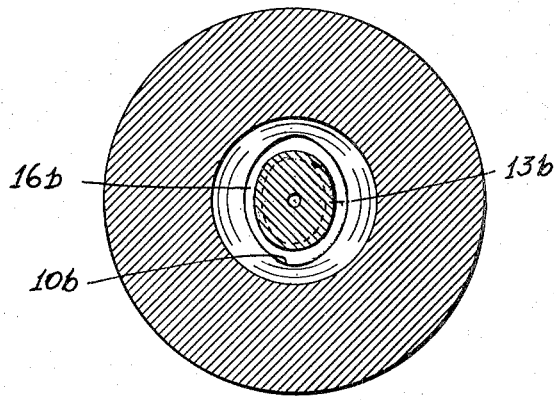
Fig. 7 is a view similar to Figs. 5 and 6, illustrating still another modification in the die construction.

In further modification of the apparatus described for the practice of the invention, Fig. 6 illustrates that the extrusion orifice 10a in the die may be circular as viewed in plan, whereby the outer surface of the tube may be circular in cross section, as mentioned in the foregoing specification. The tapered mandrel portion 13a may be elliptical in cross section. Again, the extruding orifice may be ovate, as first described, while the tapered mandrel portion may be elliptical in cross section. Compare the orifice 10b and mandrel portion 13b in Fig. 7.

Depending upon the plasticity of the particular metal to be extruded, as well as upon the type of extruding equipment available, the forming of the desired closed end tube may be effected with the metal slug or blank either hot or cold; alternatively, one of the forming steps described may be effected with the metal hot and the other with the metal relatively cold. These and other modifications and variations may be made or practiced to produce an article within the spirit of the invention defined in the appended claims.

I claim:

1. A metal turbine-blade blank comprising a relatively heavy, short mounting boss portion having a relatively light, long extruded tube portion extending integrally from such boss portion to an open end, the wall of said tube portion being of generally round contour throughout its cross section or peripheral extent and having, as the tube portion is viewed in a cross sectional plane, two oppositely located wall sections of greater thickness than wall sections located therebetween, and the several wall sections of unequal thickness in said cross sectional plane being of decreasing thickness in the longitudinal extent of the tube portion from said boss portion toward said open end.

2. A metal-turbine blade blank comprising a relatively heavy, short mounting boss portion having a relatively light, long extruded tube portion extending integrally from such boss portion to an open end, the external cross sectional configuration of said blank being substantially identical from the remote end of said boss portion to the open end of said tube portion, and the wall of said tube portion being of generally round contour throughout its cross section or peripheral extent and having, as the tube portion is viewed in a cross sectional plane, two oppositely located wall sections of greater thickness than wall sections located therebetween.

3. A metal-turbine blade blank comprising a relatively heavy, short mounting boss portion having a relatively light, long extruded tube portion extending integrally from such boss portion to an open end, the external cross sectional configuration of said blank being substantially identical from the remote end of said boss portion to the open end of said tube portion, the wall of said tube portion being of generally round contour throughout its cross section or peripheral extent and having, as the tube portion is viewed in a cross sectional plane, two oppositely located wall sections of greater thickness than wall sections located therebetween, and the several wall sections of unequal thickness in said cross sectional plane being of decreasing thickness in the longitudinal extent of the tube portion from said boss portion toward said open end.

References Cited in the file of this patent

UNITED STATES PATENTS

| | | |
|---|---|---|
| 822,285 | Lee | June 5, 1906 |
| 1,376,376 | Huntoon | Apr. 26, 1921 |
| 1,403,460 | Talty | Jan. 10, 1922 |
| 1,413,284 | Maloney | Apr. 18, 1922 |
| 1,468,092 | Towne | Sept. 18, 1923 |

FOREIGN PATENTS

| | | |
|---|---|---|
| 317,237 | Germany | Dec. 15, 1919 |